Dec. 25, 1945.  G. R. C. MARTINSSON  2,391,790
FLUID PRESSURE CONTROL VALVE
Filed July 12, 1943
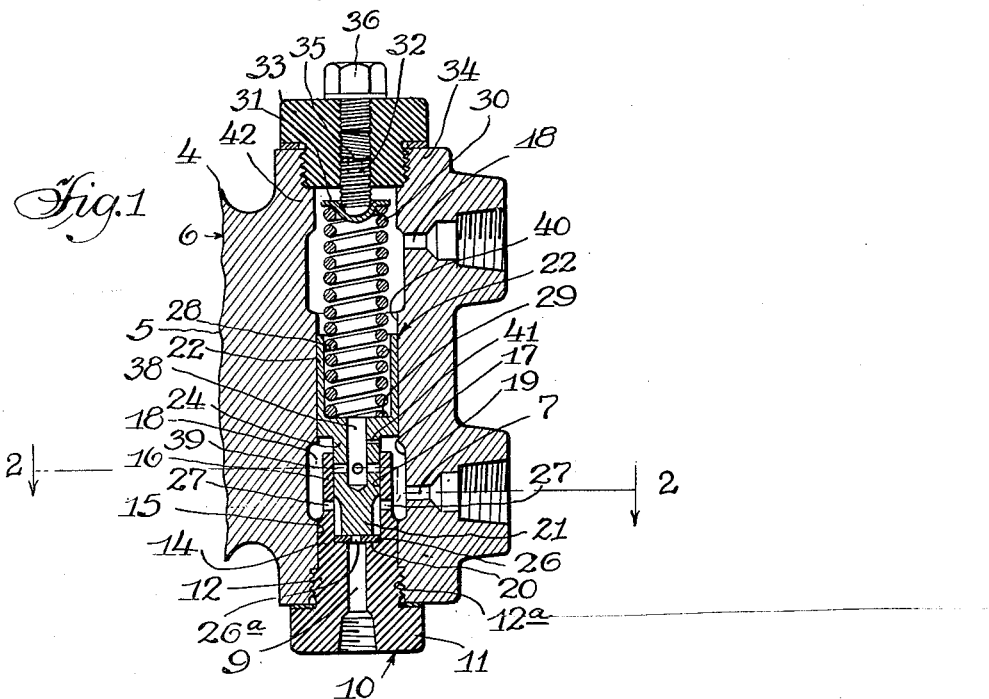
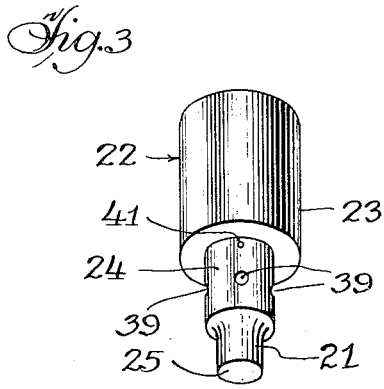
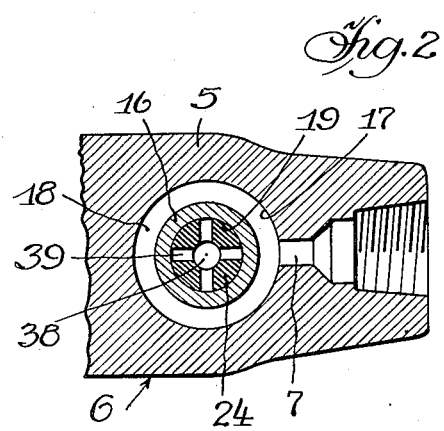
INVENTOR.
Gunnar R. C. Martinsson
BY Clarence F. Poole
Witness:
Chas. R. Kursh.

Patented Dec. 25, 1945

2,391,790

UNITED STATES PATENT OFFICE 2,391,790

FLUID PRESSURE CONTROL VALVE

Gunnar R. C. Martinsson, Chicago, Ill., assignor to Tuthill Pump Company, Chicago, Ill., a corporation of Illinois Application July 12, 1943, Serial No. 494,274

1 Claim. (Cl. 137—153)

This invention relates to improvements in valve structures especially designed for controlling the outflow of liquid under pressure from pumps and maintaining a uniform pressure in a supply line, as, for instance, in the nozzle of an oil burner.

Among the objects of the invention is to provide a simple and efficient by-pass valve of the character described, utilizing a minimum number of parts, and designed so as to be easily machined and assembled so as to be capable of economic production and affording maximum reliability and durability in operation.

Among further and more particular objects of the invention are: to provide a valve structure having but a single moving part in addition to a loading spring; to provide a structure wherein precise alignment is insured between the two parts which co-operate to form the valve means for both the supply and the by-pass outlets; and to provide a valve body wherein the supply and by-pass outlets may be mutually reversed in end-to-end relation to each other when desired.

The invention may best be understood by reference to the accompanying drawing, in which—

Figure 1 is a longitudinal section of a valve structure embodying the invention, the valve ports being shown in their closed position; that is, the position in which they are disposed when there is no pressure in the valve;

Figure 2 is a horizontal section on a somewhat enlarged scale taken on line 2—2 of Figure 1; and Figure 3 is a perspective view of the piston or plunger forming the main moving part of the device.

In the embodiment of the invention illustrated in the drawing, the valve structure is enclosed in a body 5 forming an elongated casing, indicated generally at 6.

The valve structure is primarily designed for use with a fluid pump, such as used for supplying fuel oil to the nozzle of an oil burner. In the form shown, the valve is cast as a part of the pump body, indicated at 4, said pump having suitable connection to an inlet 7, adjacent the lower end of casing 6. Said casing also has a by-pass outlet 8 adjacent its upper end, having suitable connection, as usual, with a return line to the fuel supply tank.

A supply outlet port 9 leading to the burner nozzle is formed axially of a plug 10 which, as herein arranged, is fitted in the lower end of the casing 6. In the preferred form shown, the plug 10 has an enlarged hexagonal head 11 and a threaded portion 12 adjacent thereto adapted to be engaged with corresponding threads 12a at the lower end of the casing 6.

Above the threaded portion 12 of the plug 10 is a reduced cylindrical portion 14, which is adapted to fit snugly within a finished bore 15 at the lower end of said casing. Extending above the cylindrical portion 14 of the plug 10 is a coaxial sleeve 16, which is adapted to extend upwardly into a widened hollow portion 17 of the casing 6. Said hollow portion 17 forms the main pressure chamber 18 of the valve.

The sleeve 16 of the plug 10 is formed with an upwardly opening bore 19 at the upper end of the plug 10, terminating in an upwardly facing shoulder 20 surrounding the upper end of the supply outlet port 9.

The supply outlet port 9 is controlled by a valve member 21, which herein forms an integral part of a piston 22 slidably mounted intermediate the ends of the casing 6. In the novel form shown herein, said piston consists of a main body portion 23 having a reduced cylindrical extension 24 at its lower end, which has sliding engagement in the upper end of the bore 19 in plug 10, to form therewith a sliding by-pass cut-off valve member, as will presently be described.

The valve member 21 for the supply outlet 9 is carried at the lower end of the by-pass valve extension 24, and herein consists of a second cylindrical extension, of less diameter than said by-pass valve extension, and having a relatively flat bottom face 25 which engages the upper face of a disc 26 seated on the shoulder 20 at the lower end of the bore 19 in plug 10. Said disc 26 has an aperture 26a therethrough, and is preferably made of a resilient material, such as leather, so as to form a cushioned valve seat to absorb the shock caused by rapid closing of the outlet valve member 21 thereagainst.

Suitable apertures 27, 27 extend through the side walls of the upright sleeve 16 adjacent the lower end of bore 19, so that fluid may pass from the pressure chamber 18 onto the lower end of said bore, and through the supply outlet port 9, when the outlet valve member 21 is opened.

The body portion 23 of the piston 22 also has a bore 28 at its upper end, terminating at a shoulder 29 to receive a coil compression or loading spring 30 for controlling the opening and closing of both the outlet and by-pass valves. The upper end of said compression spring is seated against a disc 31 which is mounted for vertical adjustment by means of a compression control member 32 threaded in a cap member 33.

Said cap member is secured by engagement in a threaded portion 34 at the upper end of the casing 6. The tension of the loading spring 30 may be manually controlled, as usual, by applying a suitable tool to the slotted upper end 35 of the control member 32. In the form shown, the upper end of the control member is normally covered and enclosed by a cap-screw 36 in the top of the cap member 33.

Fluid from the pressure chamber 18 is by-passed through the piston 22 to the by-pass outlet 8 at the upper end of the casing 6 by sliding cut-off valve means formed as follows:

A passageway 38 is drilled or otherwise formed axially of the piston, extending downwardly from the enlarged bore 28 through the by-pass valve extension 24 to a point adjacent its lower end. A plurality of apertures 39, 39 extends laterally from said passageway through the side walls of said extension 24.

The apertures 39, 39 are so arranged that they are normally cut off or closed by the sleeve 16 of plug 10, when the outlet valve member 21 is in closed position against the outlet port 9, and will remain cut off after said outlet port is initially opened by a predetermined pressure exerted on the lower face of the piston 22. The by-pass openings 39, 39 will not become exposed above the upper edge of the sleeve to by-pass fluid through port 8 until a greater predetermined pressure is exerted on the piston 22. Thus, fluid will not escape to the by-pass outlet 8 excepting under conditions of excessive pressure in the pressure chamber 18.

A bleeder port 41 of relatively small diameter may extend through the valve extension 24 above sleeve 16 to permit limited escape of fluid or air through the by-pass port 8, as is common practice with valves of this character.

It will further be observed that my improved valve structure is arranged so that the supply and by-pass outlets may be mutually reversed in relation to each other at opposite ends of the body 5, when desired.

In the form shown, the piston 22 has sliding engagement in a reduced cylindrical bearing portion 40 intermediate the ends of the casing 6. Moreover, the upper end of said casing is formed with a reduced cylindrical bearing portion 42 adjacent the threaded portion 34. The bearing 42 and threaded portion 34, respectively, are substantially identical with the bearing portion 15 and threaded portion 12a at the lower end of the casing, so that the plug 10 and the cap 30 may be interchangeably mounted at either end of the casing.

Accordingly, by reversing all the valve parts, together with the connections to the by-pass and intake outlets, the main supply outlet 9 may be directed toward either end of the valve casing, as is often desired when the valve is used with oil burner pumps.

It will be understood that the three reduced cylindrical bearing portions 15, 40 and 42 may be produced by initially forming the casing with corresponding unfinished portions of reduced cross-sectional area and then finishing said portions by machining them to their final diameters in any suitable manner. In the preferred form shown herein, all three bearing portions are formed with the same diameter so that they can all be machined in a single operation, thus insuring precise alignment between the sliding by-pass valve extension 24 of piston 22 and the cylindrical sleeve 16 of end plug 10, no matter to which end of the casing said end plug is applied.

It is to be understood that I do not wish to be limited to the exact embodiment of the device shown, which is merely by way of illustration and not limitation, as various other forms of the device will, of course, be apparent to those skilled in the art without departing from the spirit of the invention and scope of the claim.

I claim:

In a fluid pressure control valve, an elongated casing having similar coaxial interior cylindrical bearing portions adjacent opposite ends thereof, and a coaxial cylindrical bearing portion intermediate its ends, said casing also having fluid passageways communicating therewith adjacent opposite ends, a detachable plug having a cylindrical projection adapted to be interchangeably fitted in the cylindrical bearing portion at either end of said casing, said plug also having a sleeve adapted to project into said casing beyond either of said cylindrical end portions and having an outlet port at the lower end of said sleeve communicating with the outer end of said plug, a piston adapted to be slidably mounted in the intermediate bearing portion of said casing, said piston having a by-pass cut-off valve member adapted to be slidably engaged in said sleeve to afford communication between opposite ends of said piston in a predetermined position of the latter, said piston also having an outlet valve member extending below said slidable by-pass cut-off member and adapted to form a closure for said outlet port, a loading spring for urging said piston towards said plug member, threaded adjustment means for said loading spring, and a cap member for supporting said threaded adjustment means adapted to have detachable engagement with the casing at either end of said casing, whereby said piston, end plug and cap member may be mutually reversed in end-to-end relation in said casing to provide a reversible valve structure with its outlet connection disposed at either end of said casing.

GUNNAR R. C. MARTINSSON.